Figure 1:
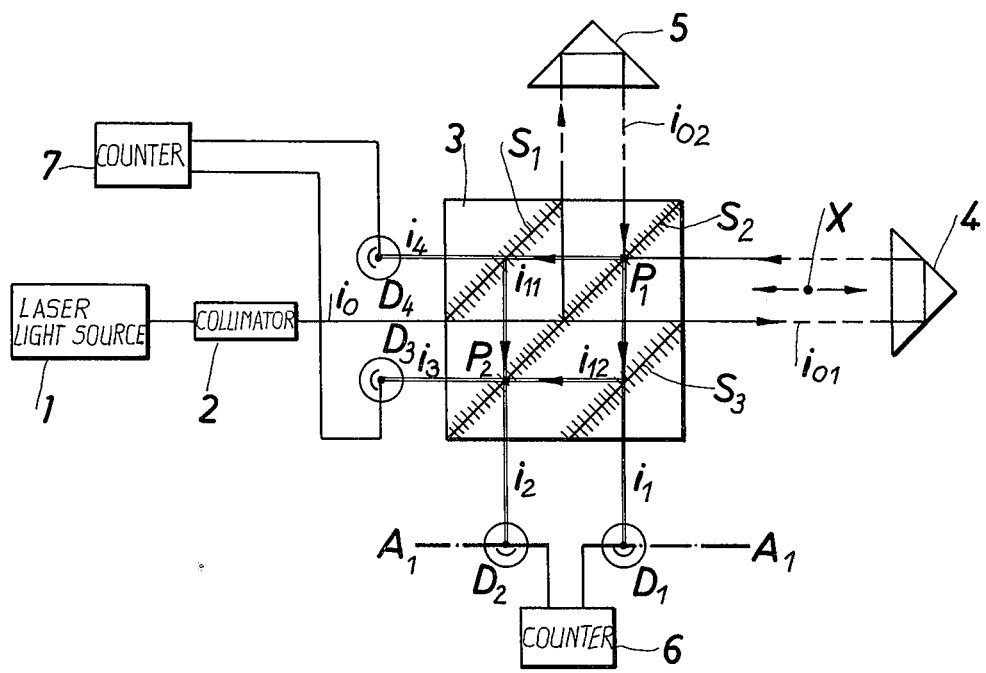

United States Patent

Amon

[11] 4,027,976
[45] June 7, 1977

[54] OPTICAL INTERFEROMETER

[75] Inventor: Georg Amon, Jena, Germany

[73] Assignee: Jenoptik Jena G.m.b.H., Jena, Germany

[22] Filed: Apr. 21, 1975

[21] Appl. No.: 570,048

[30] Foreign Application Priority Data

May 13, 1974  Germany .................... 178453

[52] U.S. Cl. ..................... 356/106 R; 356/113
[51] Int. Cl.² .................................. G01B 9/02
[58] Field of Search .......... 356/106, 107, 108, 109, 356/110, 111, 112, 113

[56] References Cited
UNITED STATES PATENTS 3,225,644  12/1965  Schuck .............................. 356/113
3,661,464   5/1972  Hubbard ......................... 356/106 R Primary Examiner—John K. Corbin
Assistant Examiner—Conrad Clark

[57] ABSTRACT

An optical interferometer, particularly for use in measurements of length, employs a light transmissive splitting cube which is provided with three beam splitting faces in parallel to each other. A light bundle entering the splitting cube is split into two partial light bundles. After passage of an optical path within the splitting cube both partial light bundles interfere with each other and produce an interference pattern. Light portions of said interference pattern interfere with each other after having passed separate light paths. Both interference patterns so produced are 90° phase-shifted relative to each other. This phase shift permits a unique determination of direction in variations of length.

7 Claims, 2 Drawing Figures

OPTICAL INTERFEROMETER

This invention relates to an optical interferometer particular for use in length measurements, which, in order to determine directional variations in length, use two interference patterns 90° phase-shifted relative to each other.

Previous optical interferometers for measurements of length permit a unique determination of the directional reflector displacements due to the employment of two interference fringe systems which have to be 90° phase-shafted relative to each other.

To effect such a 90° phase-shift a number of solutions had been proposed. A suitable solution with respect to measurements of length would be the use of adequate optical members to polarise the interfering light-bundles oppositely circular or elliptically. The light which results from the superpositioning is plane-polarised and its oscillation vector rotates when in one of the two interferometer branches the optical path length is varied. When separating the plane-polarised light into two semi-beams of the same light intensity with subsequent passage thereof through respective polarisation filters, the transmission direction of which being inclined relative to each other by 45°, then two intensity modulated light bundles are obtained having the required phase shift of 90°.

Such a procedure, however, involves considerable expenditures in optics, with further light losses and additional sources for errors with respect to the adjustment of the beams, which have to be compensated for by further measures. Furthermore special beam reflecting means are required in the interferometer arrangement in order to eliminate any adulteration of the polarisation state.

It is an object of the present invention to obviate the above disadvantages.

It is a further object of the present invention to provide an optical interferometer which permits the production of a phase-shift angle of 90°, eliminating the otherwise required use of elliptically-polarised light.

The inventional solution is based upon a known interferometer arrangement, which corresponds to a modified Michelson interferometer. Said arrangement replaces the plane mirrors by right angle prisms or reflectors, in consequence thereof the light bundle, split at the beam splitter into a reflected and into a passed through portion, is back reflected at the angle prisms parallel to the direction of light incidence, however, laterally displaced by a certain amount. Subsequently the two light portions are fused in the beam splitter.

Accordingly, the invention is concerned with an optical interferometer for producing two interference patterns 90° phase shifted relative to each other, particularly for use in length measurement, comprising a light source, a a partially transmissive optical body operative as beam splitter having a beam splitting partially silvered face inclined relative to the direction of light incidence for splitting the light originating from the light source into a first and a second partial bundle spaced apart from each other, a measuring reflector arranged in an displaceable along the light path of the first patial light bundle and a reference reflector, arranged in the light path of the second partial bundle, both back reflecting the respective partial bundles parallel and in lateral displacement to their direction of incidence to the partially transmissive optical body, the partial bundles are fused in an interference pattern at the beam splitting partially silvered face, characterized in that the beam splitter has in addition and substantially parallel to its beam splitting, partially silvered face respective further external beam splitting and partially silvered faces, which reflect back the light portions of the two partial light bundles of the interference pattern to produce a second interference pattern.

In this manner a second interference pattern is obtained, which is, due to the further superposition, 90° phase shifted relative to the first interference pattern, when the space between the two beam splitting faces is appropriately selected. Preferably, the partially transmissive optical body is a splitting cube, constituted of two equilateral right angle prisms cemented to each other at their bases, one of which being partially silvered, and wherein each of said prisms has a further partially transmitting layer in parallel to the respective base face.

It is a further advantage when the partially transmissive optical body consists of two prisms cemented to each other at the base faces, wherein each of the prisms has a partially silvered face in parallel to the associated base face and wherein the partially silvered half of the base face of the one prism is opposed by a non-silvered half of the base face of the other prism.

And finally it is advantageous if the beam splitting faces are semi-silvered layers.

The partially silvered faces mentioned hereinbefore and hereinafter are of the kind which reflects a part of the incident light and let at least permeate the other part into the underlying material.

Figure 2:
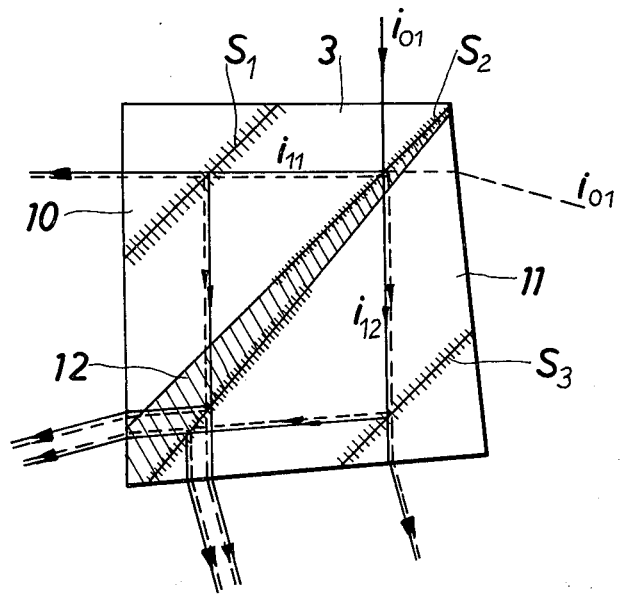

In order that the invention may be more readily understood reference is made to the accompanying drawings which illustrate diagrammatically and by way of example two embodiments thereof and in which:

FIG. 1 is a schematic view of the principle of an optical interferometer utilizing a beam splitting cube, and FIG. 2 another embodiment of the beam splitting cube of FIG. 1 in cross-section.

In FIG. 1 a light bundle $i_0$ from a laser light source 1 passes a collimator 2 to impinge upon a beam splitting cube 3.

The collimator spreads the light bundle $i_0$ and produces plane waves thereof. The beam splitting cube 3 has three partially relecting splitting layers $S_2$; $S_3$ and $S_1$ representing a first, a second and a third beam splitting partially silvered and which are arranged in paralledl to each other and inclined by 45° relative to the direction of incidence of the light bundle $i_0$. The light bundle $i_0$ is split at the splitting layer $S_2$ into a measuring light bundle $i_{01}$ (first passed-on partial bundle) and a reference light bundle $i_{02}$ (first reflected partial light bundle). A right angle prism 4 which is employed as a measuring reflector and a right angle prism 5 employed as a reference reflector back-reflect the light bundles $i_{01}$ and $i_{02}$, however, in parallel displacement to the splitting layer $S_2$, where they interfere with each other at a point $P_1$ and produce a first interference pattern. The right angle prism 4 is displaceable along the direction indicated by a double arrow X. Said first interference pattern emits light bundles $i_{11}$ (second passed-on partial light bundle) and $i_{12}$ (second reflected partial light bundle) originating from $P_1$, which are partially deviated at the splitting layers $S_1$ and $S_3$, respectively, and interfere for a second time at a place $P_2$. A portion of the light of the interference pattern such produced passes a splitting layer $S_2$ for impinging upon a photo electric detector $D_2$, whereas the remaining portion impinges upon a photo electric detector $D_3$ after deviation at the splitting layer $S_2$. The light portions $i_1$ and $i_4$ from the interference pattern at $P_1$, which have passed non-affected the splitting layers $S_3$ and $S_1$, respectively, arrive at the photo electric detectors $D_1$ and $D_4$, respectively. It can be proven by calculation that, when the light path of the partial light bundles $i_{11}$ and $i_{12}$ from $P_1$ to $P_2$ is appropriately selected, the signal pairs from the light bundles $i_1$; $i_2$ and $i_3$; $i_4$ have a phase shift of 90° relative to each other. Assuming, for the sake of simplicity, that the splitting layers $S_1$; $S_2$ and $S_3$ are partially reflecting silvered layers without any absorption and reflection losses, then the intensity $I_1$ of the interference pattern in the plane $A_1 - A_1$ will be $$I_1 = E_1 \cdot E_1^* \qquad (1)$$

where $E_1$ is the electric field vector, which can be deduced from $$E_1 = \frac{\sqrt{I_o}}{2\sqrt{2}} e^{j(\omega t + \phi)} + \frac{\sqrt{I_o}}{2\sqrt{2}} e^{j(\omega t + \pi)}, \qquad (2)$$

$E_1^*$ is the conjugate-complex quantity of $E_1$, $I_0$ is the intensity of the plane wave which impinges upon the beam splitter, $\phi$ the phase difference between the waves which interfere with each after having passed the measuring and reference path of rays, and $\omega$ the angular frequency of the light waves.

By transformation $$I_1 = \frac{I_o}{4}(1 - \cos \phi) \qquad (3)$$

will be obtained from (1) and (2).

In analogy thereto, the intensity $I_2$ of the light in the plane $A_1 - A_1$ is defined $$I_2 = E_2 \cdot E_2^*$$

where $$E_2 = \frac{\sqrt{I_o}}{2\sqrt{2}} e^{j(\omega t + \pi + \Psi + \phi)} + \frac{\sqrt{I_o}}{2\sqrt{2}} e^{j(\omega t + 2\pi + \Psi)}$$
$$+ \frac{\sqrt{I_o}}{2\sqrt{2}} e^{j(\omega t + \pi)} + \frac{\sqrt{I_o}}{2\sqrt{2}} e^{j(\omega t + \pi + \phi)} \qquad (5)$$

will yield the electric field vector $E_2$.

$E_2^*$ is conjugate-complex quantity of $E_2$ and $\psi$ is the phase difference between the two interfering light bundles $i_{11}$ and $i_{12}$.

$$I_2 = \frac{I_o}{4}(1 - \sin \phi \cdot \sin \Psi) \qquad (6)$$

is obtained by transformation.

Thus the photo electric detectors $D_1$, $D_2$ receive light portions which are cosine, respectively sine variant with $\phi$. The resulting light currents are characterized by the required phase difference of 90°.

The photoelectric signal produced by $I_2$, however, is affected by $\psi$ in the utilized height. If, however, by selection of suitable light paths, $\psi = (2k + 1)(\pi/2)$ where $i=0, 1, 2, 3 \ldots$, then the signal obtained for $I_2$ can be of the same height as $I_1$. In this case the equation (6) simplifies to $$I_2 = \frac{I_o}{4}(1 \pm \sin \phi) \qquad (7)$$

In analogy thereto a further pair of signals, having the required mutual phase shift of 90°, is obtained with respect to the photo electric detectors $D_3$; $D_4$.

The electric output signals from $D_3$ and $D_4$ are fed into a phase sensitive counter 6 for evaluation, whereas the $D_3$ and $D_4$ output signals are evaluated in a phase sensitive counter 7. In the case of application attention has to be paid to a substantially parallel course of the interfering partial bundles.

Any tilting angles between the bundles would yield interference lines with the consequence of a modulation decrease. Errors due to tiltings, not caused by the beam splitting cube, can be eliminated by correction means such as displaceable lens compensators. In contrast thereto errors caused in the beam splitting cube elude any measures since said cube consists of cemented parts. Such errors will arise if, for example, the three splitting faces $S_1$, $S_2$, $S_3$ are non-parallel to each other. For example, when cementing the glass bodies, which carry the splitting faces, wedge angles between said faces may occur. In FIG. 2 an embodiment is shown which substantially avoids such errors. A beam splitting cube 3 consists of the prismatic glass bodies 10, 11 which carry the splitting faces $S_1$ and $S_3$ and which are cemented to each other by a layer 12. Half of the base of each of the glass bodies is silvered; in which a silvered half of one base is opposed by a non-silvered half of the base of the other glass body. If, in turn, the two faces are parallel to the opposite faces which carry the splitting faces $S_1$ and $S_3$, respectively, then, as can be seen from the drawing the two bundles emitted from the beam splitting cube after the second interference are still in parallel to each other, in spite of a wedge angle between the two base faces, if the material for the optical cement 12 has the same refractive index as the glass body. The principle underlying the invention is, of course, not limited to the splitting arrangements having cemented glass prisms as described in connection with the embodiments. For example, the beam splitter can consist of two cemented glass sheets, wherein the two faces cemented with each other and the external faces are partially reflecting.

I claim:

1. An optical interferometer for producing two interference patterns 90° phase-shifted relative to each other, particular for use in length measurements, comprising
    a light source emitting a light bundle,
    a collimator for spreading said light bundle,
    a partially transmissive optical body arranged in the path of said light bundle,
        said partially transmissive optical body having a first beam splitting partially silvered face, inclinedly arranged relative to the incident light bundle,
    a second and a third beam splitting and partially silvered face, substantially in parallel with and equally spaced relative to said first beam-splitting partialy silvered face, said first beam splitting partially silvered face splitting up said light bundle into a first passed-on partial light bundle and into a first reflected partial light bundle, a measuring reflector located in the path of said first passed-on partial light bundle, said measuring reflector back-reflecting the incident first passed-on partial light bundle to said partially transmissive optical body parallel, however, in lateral displacement to said first passed-on partial light bundle, said measuring reflector being displaceable along the path of said first passed-on partial light bundle, a reference reflector located in the path of said first reflected partial light bundle, said reference reflector reflecting the incident first reflected partial light bundle back to said partially transmissive optical body in parallel, however, laterally displaced to said first reflected partial light bundle, said first passed-on partial light bundle and said first reflected partial light bundle, after reflection, being fused at said first beam splitting partially silvered face of said partially transmissive optical body and producing a first interference pattern, said first beam splitting partially silvered face splitting up the impinging fused partial light bundles into a second passed-on partial light bundle passed through said face, and into a second reflected partial light bundle reflected thereupon, the second, reflected partial light bundle being deviated at said second beam splitting partially silvered face, and fusing with the passed through second passed-on partial light bundle, being deviated at said third beam splitting partially silvered face, thereby producing a second interference pattern at said first beam-splitting partially silvered face, said first interference pattern and said second interference pattern being 90° phase-shifted relative to each other, and means for evaluation of said interference patterns, phase-shifted relative to each other.

2. An optical interferometer as claimed in claim 1, wherein said partially transmissive optical body is a splitting cube constituted of two equilateral right angle prisms cemented with each other at their bases, which are parallel to each other, and one of which being provided with a partically transmissive layer, and wherein each of said right angle prisms is separated by a partially transmissive separating layer in parallel to said base faces, into two light-transmissive bodies.

3. An optical interferometer as claimed in claim 2, wherein said partially transmissive optical body is a splitting cube constituted of two right angle prisms which are cemented to each other at their base faces, being substantially parallel to each other, and wherein a partially transmissive layer is applied to each of said base faces in such a manner that a transmissive half of the one base face is opposed by a non-transmissive half of the other base face.

4. An optical interferometer as claimed in claim 1, wherein said first, second and third beam splitting face is embodied as a semi-silvered layer.

5. An optical interferometer as claimed in claim 1, wherein said first, second and third beam splitting face are inclined by 45° with respect to the angle of incidence of said light bundle.

6. Optical interferometer as claimed in claim 1, wherein said measuring reflector and said reference reflector are right angle roof-edge prisms selected from light transmissive material, the base faces of which are at right angles to the direction of the incident light, wherein said measuring reflector is displaceable in the direction of the incident said first passed-on partial light bundle.

7. An optical interferometer as claimed in claim 1, wherein said means for evaluating the two interference patterns which are 90° phase-shifted relative to each other, comprise a photo electric detector for receiving the light from said first interference pattern, a further photo electric detector for receiving the light from said second interference pattern and a phase sensitive counter for evaluating the electrical output signals from the photo electric detectors.

* * * * *